United States Patent [19]
Schmidlin

[11] 3,921,460
[45] Nov. 25, 1975

[54] PRECISION LIQUID-HANDLING INSTRUMENT

[76] Inventor: Albertus E. Schmidlin, 28 Highview Road, Caldwell, N.J. 07006

[22] Filed: Sept. 6, 1974

[21] Appl. No.: 504,004

[52] U.S. Cl. ............................................... 73/425.6
[51] Int. Cl.² ........................................... B01L 3/02
[58] Field of Search ..... 73/425.4 P, 425.6, 425.4 R; 55/55, 58, 158

[56] References Cited
UNITED STATES PATENTS
3,285,296  11/1966  Ishimarv ........................... 73/425.6

Primary Examiner—S. Clement Swisher
Attorney, Agent, or Firm—Nathan Edelberg; Robert P. Gibson; Thomas R. Webb

[57] ABSTRACT

An instrument for transferring a precise volume of a liquid from one vessel to another comprises a shell forming a liquid chamber having walls that are impervious to liquids except for a very small entrance opening, with the entire inner surface formed of Teflon, and either a portion or all of the walls being pervious to gases, so that the liquid can be drawn into the chamber, and gases can be removed from the liquid in the chamber, by exhausting the gas-pervious portion of the chamber walls.

8 Claims, 4 Drawing Figures

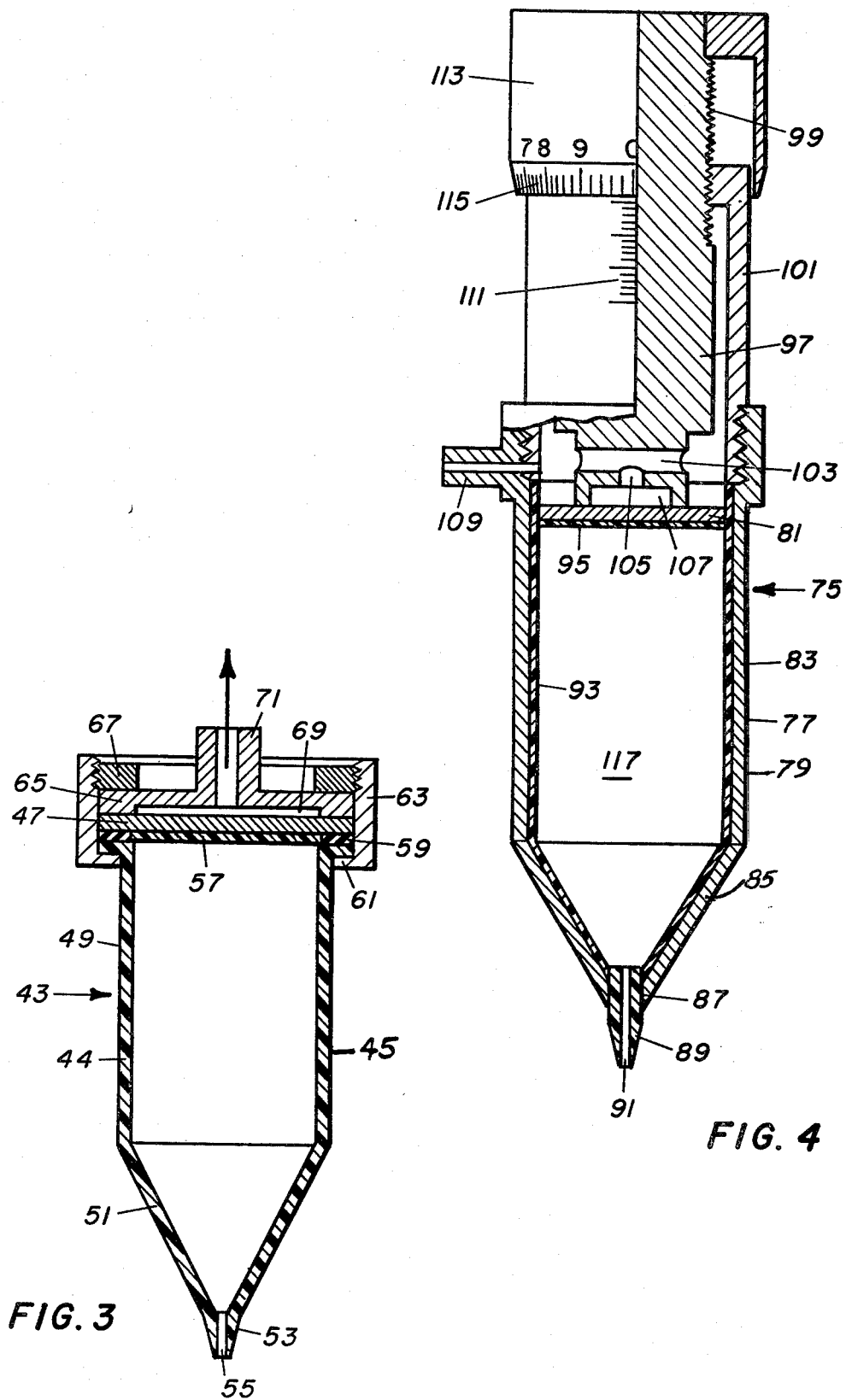

PRECISION LIQUID-HANDLING INSTRUMENT

GOVERNMENTAL INTEREST

The invention described herein may be manufactured, used and licensed by or for the Government for governmental purposes without the payment to me of any royalty thereon.

BACKGROUND AND BRIEF SUMMARY OF THE INVENTION

The present invention relates to an improved precision instrument for handling liquids, and more specifically, for transferring a predetermined quantity of liquid from one vessel, e.g., a liquid source, to another vessel. The instrument is similar to a pipette except that it is not necessarily graduated, and hence, might not be considered a measuring instrument.

The automation of the clinical laboratory requires the application of new concepts in the metering and dispensing of reagent and sample fluid solutions. Implementation of the functions performed formerly manually by laboratory technicians cannot be accomplished by direct analogs of the motions of the human being. Moreover, it is obviously desirable to improve the accuracy of laboratory instruments for manual as well as automatic use. Some improvements have been made in classical equipment. An example is the "Micropipette," which maintains an accuracy of 0.3 percent by means of an overflow tube of 0.15 mm internal diameter. Another device, described in U.S. Pat. No. 3,232,117, is a micrometer buret that comprises a conventional syringe barrel containing a tight-fitting Teflon piston driven by a micrometer screw, for which an average accuracy of 5 parts per 1,000 in sample volumes of 10 microliters is claimed. This unit has a very small nozzle having an I.D. of 0.05 to 0.1 mm. It is impossible to mechanize these devices in a straightforward way. The flow rates of the capillary tubes necessitate a slow time cycle unless high pressures are used. Further, these devices still require the perception and technique of an operator, and the presence of an air bubble requires manual correction.

In accordance with the present invention, a pipette, buret or other instrument for transferring a liquid from one vessel to another is provided with a liquid chamber having walls that are impervious to liquids except for a very small entrance bore, with the entire inner surface of the walls formed of a non-wetting material, such as Teflon, and at least a portion of the walls being porous or pervious to gases, such as air, so that the liquid can be drawn into the chamber through the entrance bore, and gases can be removed from the liquid in the chamber, by subjecting the outer surface of the porous wall portion to a partial vacuum. When this instrument is coupled to an exhaust pump and filled by submerging the entrance bore into a liquid source, the chamber can be completely filled with a precise amount of the liquid, determined by the volume of the chamber, because of the removal of all bubbles of air or other gas. Moreover, when the liquid is subsequently dispensed into another vessel, the non-wetting inner surface prevents any drops of the liquid from sticking to that surface, which insures dispensing a precise amount of gas-free liquid. A further advantage of the present invention is the fact that the instrument is self-cleaning because of the non-wetting property.

One example of the use of the present invention in automatic equipment is as each of the pipettes in a precision multiple point liquid loader.

Several alternative embodiments are disclosed as examples of chamber structures that can be used. The chamber walls may be made of metal coated with the non-wetting material, or entirely of the non-wetting material. Where the entire chamber wall or walls are porous to gases, the instrument may be mounted within a gas-tight enclosure, which is connected to an air pump. On the other hand, a porous portion of the chamber wall may be subjected to a partial vacuum.

BRIEF DESCRIPTION OF THE DRAWING

FIGS. 3 and 4 are similar views of two other embodiments of the invention wherein only a portion of the chamber wall is porous and adapted to be coupled to an exhaust pump.

DETAILED DESCRIPTION OF THE INVENTION

FIGS. 1–4 show, for examples, four different embodiments of precision liquid-transfer instruments embodying the present invention.

Figure 1:
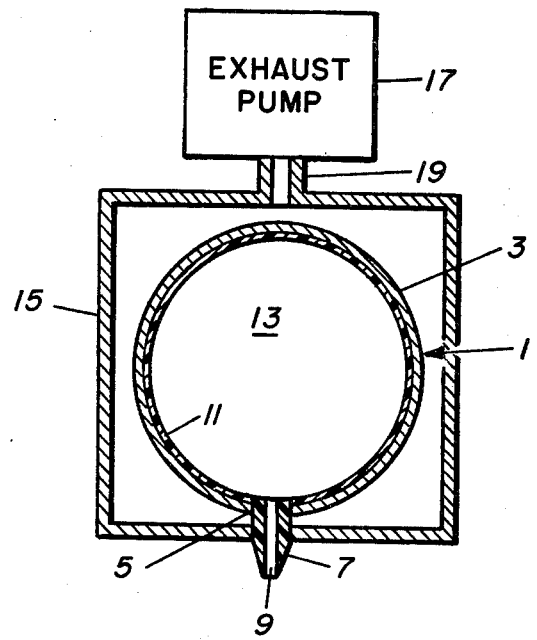
FIGS. 1 and 2 are axial section views of two different embodiments of instruments incorporating the present invention mounted within an exhaust housing.

In FIG. 1, the instrument 1 comprises a thin-walled spherical shell 3 that is continuous, and hence, impervious to liquids, except for a small entrance opening 5 in which a hollow plastic nipple 7 having an externally tapered tip is mounted in liquid-tight relation. The nipple 7 has a very small bore 9 therethrough, having a diameter of about 0.75 mm, for a shell volume of about 1 cc, for example.

In accordance with the invention, the shell 3 is made of a gas-pervious metal, and the entire inner surface of the shell 3 is coated with a gas pervious thin layer 11 of a non-wetting material, such as Teflon, which is a polyfluorohydrocarbon resin. Preferably, the plastic nipple 7 should also be made of a non-wetting material, to prevent the adherence of liquid drops thereto after dispensing is completed. The interior of the coated shell 3 constitutes a liquid chamber 13 which can be manufactured to have a predetermined volume within a tolerance of about one-tenth of one per cent.

The porous shell 3 may, for example, be made of Type 316L sintered stainless steel, made by the process of U.S. Pat. No. 2,554,340, and marketed by Pall Trinity Micro Corporation, Cortland, New York, with mean pore sizes from 5 to 165 microns. The shell 3 may be made in two hemispherical parts, which are coated and then sealed together to form a sphere. The Teflon coating 11 may be produced by any conventional method, such as spraying or atomizing.

In order to fill the chamber 13 with a liquid, the shell 3 may be mounted within a gas-tight exhaust housing 15, e.g., of metal or plastic, shown schematically in FIG. 1 as a hollow cube, with the nipple 7 sealed through the housing, connected to an exhaust means, such as a pump 17 by a tube 19.

In operation, the pump 17 reduces the air pressure in the housing 15, which exhausts the air within the chamber 13, drawing the liquid from the source (not shown) into the chamber. Eventually, the chamber 13 is completely filled with a precise volume of gas-free liquid. The liquid is transferred and dispensed into a second vessel (not shown) by reversing the pump 17 and forcing air into the housing 15 and chamber 13 until all of the liquid is removed from the chamber.

Figure 2:
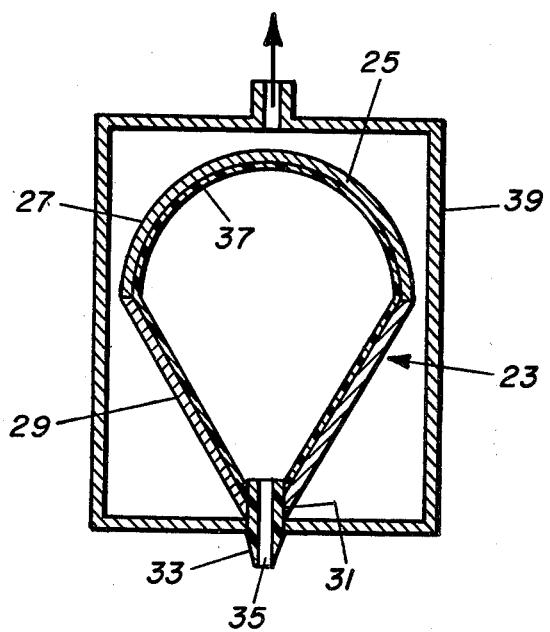

FIG. 2 shows a liquid-transfer instrument 23 comprising a gas-pervious liquid-impervious shell 25 made up of an upper hemispherical portion 27 sealed to a lower conical portion 29 having a small opening 31 in which a hollow plastic nipple 33 having an externally tapered tip is sealed. The nipple has a very small bore 35 and is made of a non-wetting material, such as Teflon. The shell 25 may be made of porous sintered stainless steel, like the shell 3 of FIG. 1. The entire inner surface of the shell 25 is coated with a thin, gas-pervious layer 37 of non-wetting material, such as Teflon. The instrument 23 may be mounted in an exhaust housing 39 for operation like the instrument 1 in FIG. 1.

FIGS. 3 and 4 show modifications wherein only a portion of the shell of the instrument is gas-pervious and subjected to a partial vacuum.

FIG. 3 shows an instrument 43 comprising a shell 44 made up of a gas and liquid-impervious part 45 and a gas-pervious, liquid-impervious end plate part 47. The shell part 45 in this embodiment comprises a cylindrical barrel portion 49 and a conical portion 51 terminating at its lower end in an externally tapered tip 53 having a very small bore 55, and is made of a non-wetting plastic material, such as Teflon. The walls of the part 45 are of substantial thickness, and hence, are not pervious to gases. The end plate 47 is made of a porous metal, like the shell 3 in FIG. 1, and is coated on the lower side with a thin, gas-pervious layer 57 of non-wetting material, such as Teflon. The coated end plate 47 may be sealed to the part 45 by means of a resilient gasket 59 clamped between the periphery of plate 47 and a flange 61 on part 45 by a flanged ring 63, a flanged exhaust fitting 65, and a clamp ring 67 threaded in ring 63, as shown in the drawing. The exhaust fitting 65 has a recess 69 in its lower side coextensive with the coating 57, and a tube 71 for connection to an exhaust pump (not shown). The operation of instrument 43 is the same as in FIGS. 1 and 2, except for the fact that only the part 47 of the shell 44 is gas-pervious.

FIG. 4 shows a modification of FIG. 3 wherein the upper plate is slidable within the barrel portion to adjust the volume of the liquid chamber. The instrument 75 comprises a shell 77 made up of a gas and liquid-impervious part 79 and a gas-pervious, liquid-impervious end plate part 81. The part 77 comprises a cylindrical barrel portion 83 and a conical portion 85 having a small bore 87 in which a Teflon nipple 89 having an externally tapered tip and a very small bore 91 is sealed. The portions 83 and 85, which may be made of any suitable metal or plastic, are coated on the inside with a layer 93 of non-wetting material, such as Teflon. The porous plate 81, which may be made of sintered stainless steel, is coated on the lower side with a thin, gas-pervious layer 95 of a non-wetting material, such as Teflon. Plate 81 is slidably mounted with a snug fit within the barrel part 83 and attached to the lower end of adjusting rod 97. The upper end of rod 97 is connected by fine threads 99 in the upper end of a support tube 101 which is threaded into the upper end of barrel part 83. Rod 97 is formed with radial and axial bores 103 and 105, respectively, and an end recess 107, to permit circulation of air. The upper end of barrel part 83 is provided with a nipple 109 for connection to an air pump. The outer surface of tube 101 is provided with a volume scale 111 which cooperates with the lower edge of a ring or sleeve 113 attached to rod 97 and having a vernier scale 115. The movable piston cooperates with the shell parts 83, 85 and 89 to form a liquid chamber 117 of adjustable volume. The scales may be calibrated by accurate calculation of the positions of the rod 97 for several desired chamber volumes, or by filling the chamber 117 with several different known volumes of liquid and noting the corresponding positions of the rod 97.

The foregoing disclosure and drawings are merely illustrative of the principles of this invention and are not to be interpreted in a limiting sense. I wish it to be understood that I do not desire to be limited to exact details of construction shown and described, because obvious modifications will occur to a person skilled in the art.

What is claimed is:

1. A precision instrument comprising: a chamber having walls that are impervious to liquids except for an open entrance bore of small diameter, the entire inner surface of said walls being formed of a non-wetting material, at least a portion of said walls being pervious to gases; whereby gases can be removed from a liquid within said chamber by subjecting the outer surface of said wall portion to a partial vacuum; said wall portion being made of a porous metal having a thin gas-pervious inner layer of a polyfluorohydrocarbon resin bonded thereto.

2. An instrument, as in claim 1, wherein the remainder of said walls are made of a polyfluorohydrocarbon resin.

3. An instrument as in claim 1, wherein substantially the entire walls of said chamber are made of a porous metal having a gas-pervious inner coating of a polyfluorohydrocarbon resin.

4. An instrument as in claim 3, wherein said chamber is a sphere with an externally-tapered entrance tip containing said bore.

5. An instrument as in claim 3, wherein said chamber walls comprise a hemispherical portion, a frusto-conical portion, and an externally tapered tip portion containing said bore.

6. An instrument as in claim 3, wherein said chamber comprises a barrel, including a cylindrical portion, open at one end, a frusto-conical portion and an externally tapered tip portion containing said bore, and a cover plate constituting said gas pervious wall portion liquid sealed across said open end.

7. An instrument as in claim 6, wherein said cover plate is axially slidable in said cylindrical portion to adjust the volume of said chamber, and is connected to said barrel by micrometer adjustment means.

8. An instrument as in claim 3, further comprising means for subjecting the outer surface of said gas-pervious wall portion to a partial vacuum.

* * * * *